United States Patent [19]
Chao

[11] Patent Number: 5,438,386
[45] Date of Patent: Aug. 1, 1995

[54] COAXIAL MASTER-SLAVE LENS PHOTOGRAPHING APPARATUS

[75] Inventor: Zu-Wen Chao, Hsinchu, Taiwan

[73] Assignee: Industrial Technology Research Institut, Hsinchu, Taiwan

[21] Appl. No.: 175,642

[22] Filed: Dec. 30, 1993

[51] Int. Cl.⁶ .................... G03B 13/36; G03B 13/02
[52] U.S. Cl. .................... 354/402; 354/225; 354/288
[58] Field of Search .............. 354/402, 219, 224, 225, 354/288; 348/341, 345, 358, 373, 335

[56] References Cited
U.S. PATENT DOCUMENTS
4,474,446 10/1984 Reynolds et al. .................... 354/402

Primary Examiner—W. B. Perkey
Attorney, Agent, or Firm—Lackenbach Siegel Marzullo Aronson & Greenspan

[57] ABSTRACT

A coaxial master-slave lens system is provided. The coaxial master-slave lens system can be either fixed-focus type or zoom type, and can be equipped to any camera equipment. In such a coaxial master-slave lens system, a slave lens is provided as an additional attachment to the master lens. The slave lens is provided with a center hollowed portion for accommodating the master lens in such a manner that the slave optical axis is in coincidence with the master optical axis; the slave front lens plane is in coincidence with the master front lens plane; the slave rear lens plane is in coincidence with the master rear lens plane; the slave front focus point is in coincidence with the master front focus point; and the slave rear focus point is in coincidence with the master rear focus point.

6 Claims, 21 Drawing Sheets

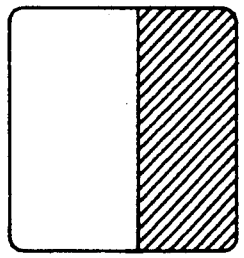
FIG. 12a1(PRIOR ART)
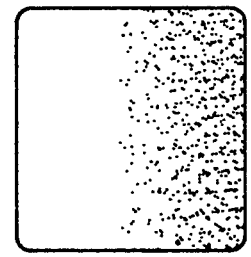
FIG. 12b1(PRIOR ART)
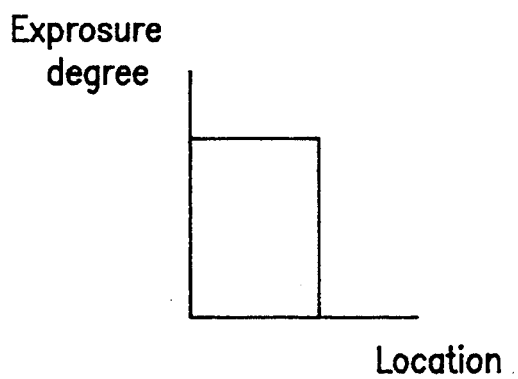
FIG. 12a2(PRIOR ART)
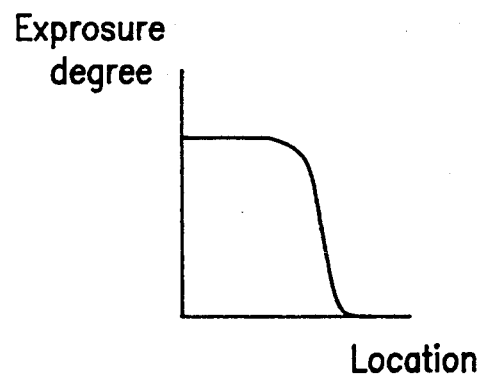
FIG. 12b2(PRIOR ART)
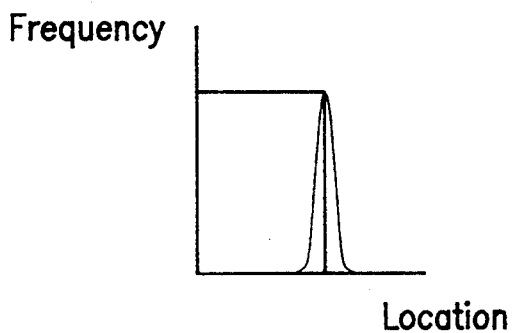
FIG. 12a3(PRIOR ART)
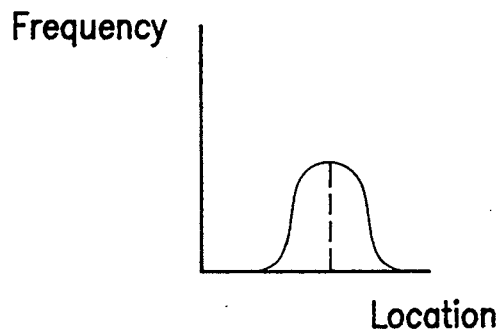
FIG. 12b3(PRIOR ART)

COAXIAL MASTER-SLAVE LENS PHOTOGRAPHING APPARATUS

BACKGROUND OF THE INVENTION

1. Field of the Invention

The present invention relates to photographing apparatus, and more particularly to a coaxial master-slave lens photographing apparatus.

2. Description of Prior Art

Conventional photographing equipment includes two major categories: the camera and the camcorder. The camera is further divided into two types: the single lens reflection (SLR) type and the lens shutter type. For any category or type of photographing apparatus, three optical systems must be included:

(1) photographing optical system;
(2) viewfinder optical system; and
(3) focusing optical system.

(1) Photographing optical system

In general, the photographing optical system is comprised of a master lens and a photo-sensing device. FIG.1 shows the structure of a conventional SLR type camera 50. To photograph an object, a light ray 10 reflected by the object passes through master lens group 1 and then forms an image on film 8.

(2) Viewfinder optical system

The structure of the viewfinder optical system of the conventional SLR type camera 50 is also shown in FIG.1. Light ray 10 passes through the master lens group 1 and then reaches reflection mirror 3 to be reflected to pentagon prism 4. Reflected twice within the pentagon prism 4, the light ray 10 reaches on eyepiece 2 and multi-sensor photo-detector 5. Through the eyepiece 2, the camera user may thus see the image of the object. FIGS. 2A–2B show the SLR type camera when used respectively in viewfinding and photographing; FIGS. 3A–3C show the SLR type camera when the mirror raises and the shutter is open during viewfinding.

From FIGS. 2A–2B, it can be seen that to photograph the image of the object, the reflection mirror 3 should be raised so as to allow light from the main lens group 1 to pass to the film 8. For this reason, viewfinding and photographing can not be carried out at the same time. Still, as shown in FIG.3, after the shutter release button is pressed for photographing, the shutter can be released only after the reflection mirror 3 has been raised. Opening the shutter thus can not be carried out directly after the shutter release button is pressed. Moreover to these disadvantages, it can be seen from FIG. 1 that the conventional SLR type camera is very complicated in the structure of its viewfinder optical system.

FIG. 4 shows the structure of a conventional shutter-in-lens type camera. In this type of camera, the viewfinder optical system and the photographing optical system are independent to each other: light ray 10a passes lens 2a and then reaches eyepiece 2. As illustrated in FIG. 5, the optical axis 30 of the viewfinding optical system is not in coincidence with the optical axis 20 of the photographing optical system. As a consequence, the imaging of object in the viewfinder optical system is not the same as that in the photographing optical system. Also, as shown in FIG. 6, when a zoom lens is used, the lens group 12 of this type of camera should be focus-varied corresponding to the variation of focus in the zoom lens. The viewfinder optical system is thus very complicated in structure.

FIG. 7 shows the structure of a conventional camcorder. A light ray 10 passes through first lens group 1a and then reaches photo-splitter 15 to be divided into two rays, first ray 10b and second ray 10c. The first ray 10b, after passing through second lens group 1b, forms an image on image plane 8; while the second ray 10c, after passing through third lens group 1c, forms an image on CCD photo-sensor array 1d. The image signal generated by the CCD photo-sensor array is subsequently processed by image processor 1e to form the photographed images on CRT display 1f (LCD display can be used instead). The displayed images can be viewed by the user through eyepiece lens group 2. This type of camcorder as described has three drawbacks. First, the camcorder has a complex structure that requires a great number of components for construction; and CRT, which is expensive, is included in the structure, so that cost is too high to be affordable by consumers. Second, with the provision of the photo-splitter, the light ray 10b is reduced in intensity before forming the image. Third, the image processor and the CRT are components that consume a great amount of electric power.

The following table summarizes and compares the advantages and disadvantages of viewfinder optical systems respectively in the conventional SLR type camera, shutter-in-lens camera, and camcorder.

TABLE 1

| | Viewfinder Optical Systems | | |
|---|---|---|---|
| | SLR camera | Shutter-in-lens camera | camcorder |
| Design Principle | optical axis no in coincidence with that of photographing optical system using a jumping plane mirror (see FIG. 1) | Independent of photographing system | optical axis not in coincidence with that of photographing optical system using a fixed light splitter |
| Performance Viewfinder optical axis in coincidence with that of photographing optical system? | Good Yes / Poor | Good / Poor No (see FIG. 5) | Good Yes / Poor |
| Light flux not split by viewfinder | Yes | Yes | No (see FIG. 7) |

TABLE 1-continued

| | Viewfinder Optical Systems | | |
|---|---|---|---|
| | SLR camera | Shutter-in-lens camera | camcorder |
| system and thus reduced in intensity? | | | |
| Photographing and viewfinding able to function concurrently? | No (see FIG. 3) | Yes | Yes |
| Shutter opened right after the shutter release button is pressed? | No (see FIG. 3) | Yes | Yes |
| Viewfinder system more light and compact when fixed-focus lens is mounted? | No (see FIG. 1) | Yes | Yes |
| Viewfinder system more light and compact when zoom lens is mounted? | No (see FIG. 1) | No (see FIG. 1) | Yes |
| Viewfinding and imaging require power consumption? | Yes | Yes | No |
| Resolution of the image in viewfinder high? | Yes | Yes | No |
| Image in viewfinder close to true color? | Yes | Yes | No (see FIG. 7) |

(3) Focusing optical system

FIG. 8A shows the structure of focusing optical system in SLR type camera. Light entering into the lens passes in part through semi-reflection mirror 3 and then, after reflected by full-reflection mirror 3a, reaches at focusing error correcting unit which is coupled to focus adjustment control motor 6. Working principle of the focusing error correction is illustrated in FIG. 8B, which is a conventional technique so that details will not be described.

The conventional shutter-in-lens type camera is constructed based on either of two principles, respectively illustrated in FIGS. 9A–9B and FIG. 10. In the system of FIG. 9A, light rays reflected from an object enter the focusing optical system through two apertures 41 and 42, thus forming two separate images as shown in FIG. 9B. Focusing is effected based on the intensity difference between the two images. Drawbacks of this system include that the optical axis of the focusing optical system is not in coincidence with that of the photographing optical system; the focusing optical system and the viewfinder optical system can not monitor each other; and the mechanical construction for the focusing optical system is very complicated. On the other hand, in the system of FIG. 10, a photo-emitting device 16 sends out a light beam to an object being photographed and a photo-sensor 17 receives the reflection of the light beam from the object for focusing. As illustrated in FIG. 11, drawbacks of this system include that the system may mistake object AA', which is to be focused, for another object BB'; and that the focusing mechanism and the viewfinder can not monitor each other.

The following table summarizes and compares the advantages and disadvantages of focusing optical systems respectively in the conventional SLR type camera, shutter-in-lens camera, and camcorder.

TABLE 2

| | Focusing optical System | | | |
|---|---|---|---|---|
| | SLR camera | Shutter-in-lens camera | | camcorder |
| Illumination of object | Same as photographing system | Same as photographing system | Reflect a light beam from the camera | Same as photographing system |
| Method of collecting | Use part of photograph- | Independent of photo- | Independent of photo- | Completely dependent |

TABLE 2-continued

| | Focusing optical System | | | | | | | |
|---|---|---|---|---|---|---|---|---|
| | SLR camera | | Shutter-in-lens camera | | | | camcorder | |
| object light | system and then split the light with the jumping mirror | | graphing system; use two separate apertures for imaging | | graphing system; use one single aperture for imaging | | on the photographing system | |
| Processing of object light | Split the object image and the compare the two. | | Overlap the split images for comparison | | Use photo-imparting sensors | | Perform FFT analysis to the object image | |
| Reference FIG. | FIG. 8 | | FIG. 9 | | FIG. 10 | | FIG. 12 | |
| Performance | Good | Poor | Good | Poor | Good | Poor | Good | Poor |
| Optical axis in coincidence with that of the photographing system? | Yes | | | No (see FIG. 9) | Yes | | Yes | |
| Not mistake other objects for the one being under focusing? | Yes | | Yes | | | No (see FIG. 11) | | No (see FIG. 11) |
| Light source need not to be self-prepared? | Yes | | Yes | | | No | Yes | |
| Processing of electric signal generated by the focusing system not complex? | Yes | | Yes | | Yes | | | No |
| Focusing and viewfinding able to monitor each other? | Yes | | | No | | No | Yes | |
| Mechanical construction of the focusing system not complex, i.e. does not have to actuate a plane mirror? | | No (see FIG. 8) | | No (see FIG. 9) | Yes | | Yes | |

SUMMARY OF THE INVENTION

It is therefor a primary objective of the present invention to provide a coaxial master-slave lens camera that overcomes the drawbacks of conventional camera systems mentioned above.

It is another objective of the present invention to provide a coaxial master-slave lens camera that combines viewfinder, focusing, and photographing systems into an integral structure simple in complexity and versatile in utilization. The manufacturer can therefore offer a basic camera structure by which the user may change the equipment from camera to camcorder or from camcorder to camera through the change of photo-sensing means.

In accordance with the foregoing and other objectives of the present invention, a coaxial master-slave lens system is provided. The coaxial master-slave lens system can be either fixed-focus type or zoom type, and can be equipped to any camera equipment. In such a coaxial master-slave lens system, a slave lens is provided as an additional attachment to the master lens. The slave lens is provided with a center hollowed portion for accommodating the master lens in such a manner that: (1) the slave optical axis is in coincidence with the master optical axis; (2) the slave front lens plane is in coincidence with the master front lens plane; (3) the slave rear lens plane is in coincidence with the master rear lens plane; (4) the slave front focus point is in coincidence with the master front focus point; and (5) the slave rear focus point is in coincidence with the master rear focus point.

In anther preferred embodiemtn, the present invention is applied in a zoom lens. The zoom lens consists of a number of master lens groups, each lens group having a master optical axis, a master front lens plane, a master rear lens plane, a master front focus point, and a master rear focus point. A plurality of slave lenses equal in number to the master lens groups, each slave lens having a slave optical axis, a slave front lens plane, a slave rear lens plane, a slave front focus point, and a slave rear focus point. Each slave lens has a center hollowed portion for accommodating each the master lens in such a manner that (1) the slave optical axis is in coincidence with the master optical axis; (2) the slave front lens plane is in coincidence with the master front lens plane; (3) the slave rear lens plane is in coincidence with the master rear lens plane; (4) the slave front focus point is in coincidence with the master front focus point; and (5) the slave rear focus point is in coincidence with the master rear focus point. An photographing optical system is used to receive light rays passing through the master lens. A viewfinder optical system is used to receive light rays passing through the slave lens. A focus adjustment optical system is provided for receiving light rays passing through the slave lens to generate focus adjustment servo signal.

In the coaxial master-slave lens camera system, the viewfinder optical system may further include a plane mirror group for reflecting part of the light rays passing through said slave lens. Also, the focusing optical system may further include a plane mirror group for reflecting part of the light rays passing through said slave lens.

When the coaxial master-slave lens system is equipped to a camera, the photographing optical system of the camera receives light rays passing through the master lens; the viewfinder optical system receives light rays passing through the slave lens; and the focus adjustment optical system for receiving light rays passing through the slave lens to generate focus adjustment servo signal.

BRIEF DESCRIPTION OF THE DRAWINGS

The present invention can be more fully understood by reading the subsequent detailed description of the preferred embodiments thereof with references made to the accompanying drawings, wherein:

FIG. 5A is an illustration used exemplarily to show an aberration resulted from the non-coincidence of the two optical axes shown in FIG. 5A;

FIG. 12 shows Fast Fourier Transform (FFT) analysis diagrams for the conventional camcorder;

DETAILED DESCRIPTION OF THE PREFERRED EMBODIMENTS

Figure 14:
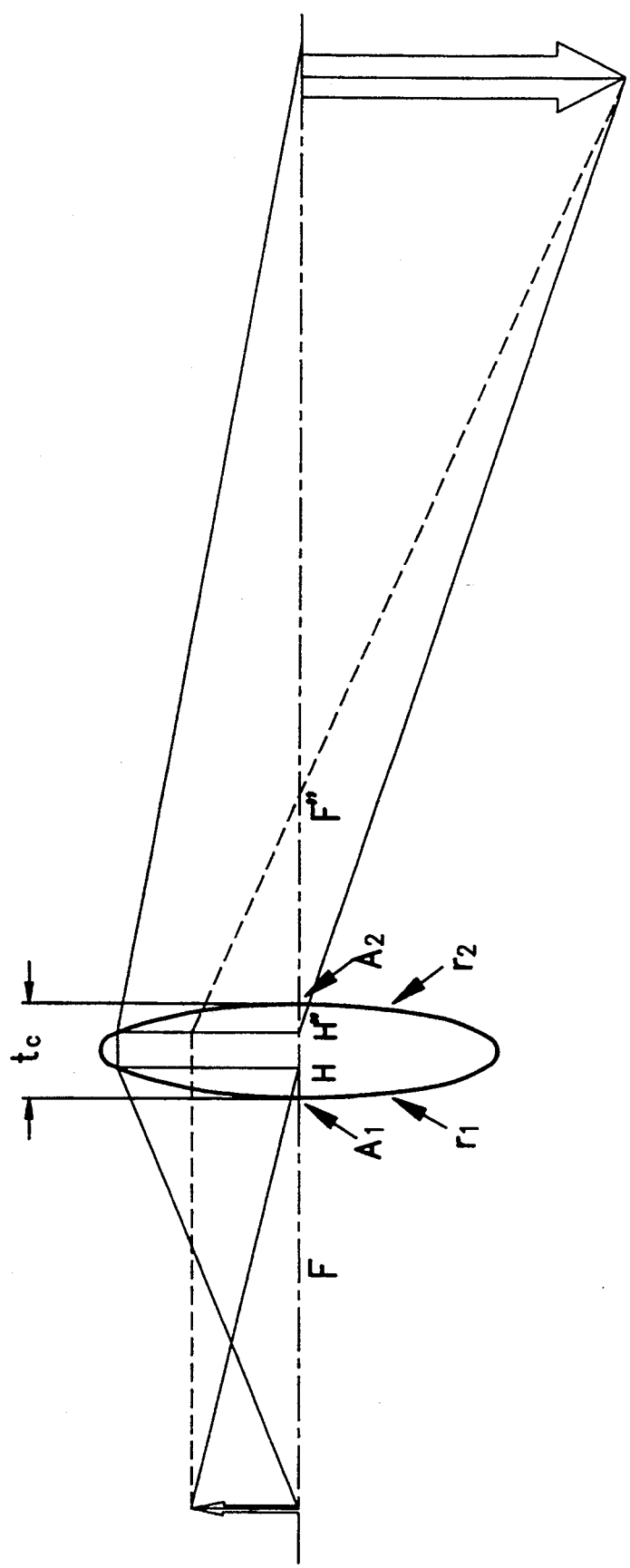
FIG. 14 is a schematic diagram illustrated to demonstrate the imaging principle of a single lens.

As shown in FIG. 14, a lens can be specified by its two apexes $A_1$ and $A_2$, center thickness $t_c$ measured from $A_1$ to $A_2$, two focus point F and F", index of refraction n, and two lens planes. The radius of curvature of the front lens plane is $r_1$ and that of the rear lens plane is $r_2$. Denote the intersection of the first lens plane and the optical axis by H, which will be referred to as the first lens point; and denote the intersection of the second lens plane and the optical axis by H", which will be referred to as the second lens point. With these conventions, the following formulas can be derived:

$$1/FH = (n-1) \cdot (1/r_1 - 1/r_2) + [(n-1)^2/n] \cdot (t_c/r_1 \cdot r_2) \quad (1)$$

$$FH = F''H'' \quad (2)$$

$$A_2H'' = \frac{-r_2 \cdot t_c}{n \cdot (r_2 - r_1) + t_c \cdot (n-1)} \quad (3)$$

$$A_1H = \frac{-r_1 \cdot t_c}{n \cdot (r_2 - r_1) + t_c(n-1)} \quad (4)$$

From the above equations, it can be seen that an image formed by the lens is the same as that formed by either of its two lens planes.

Figure 15:
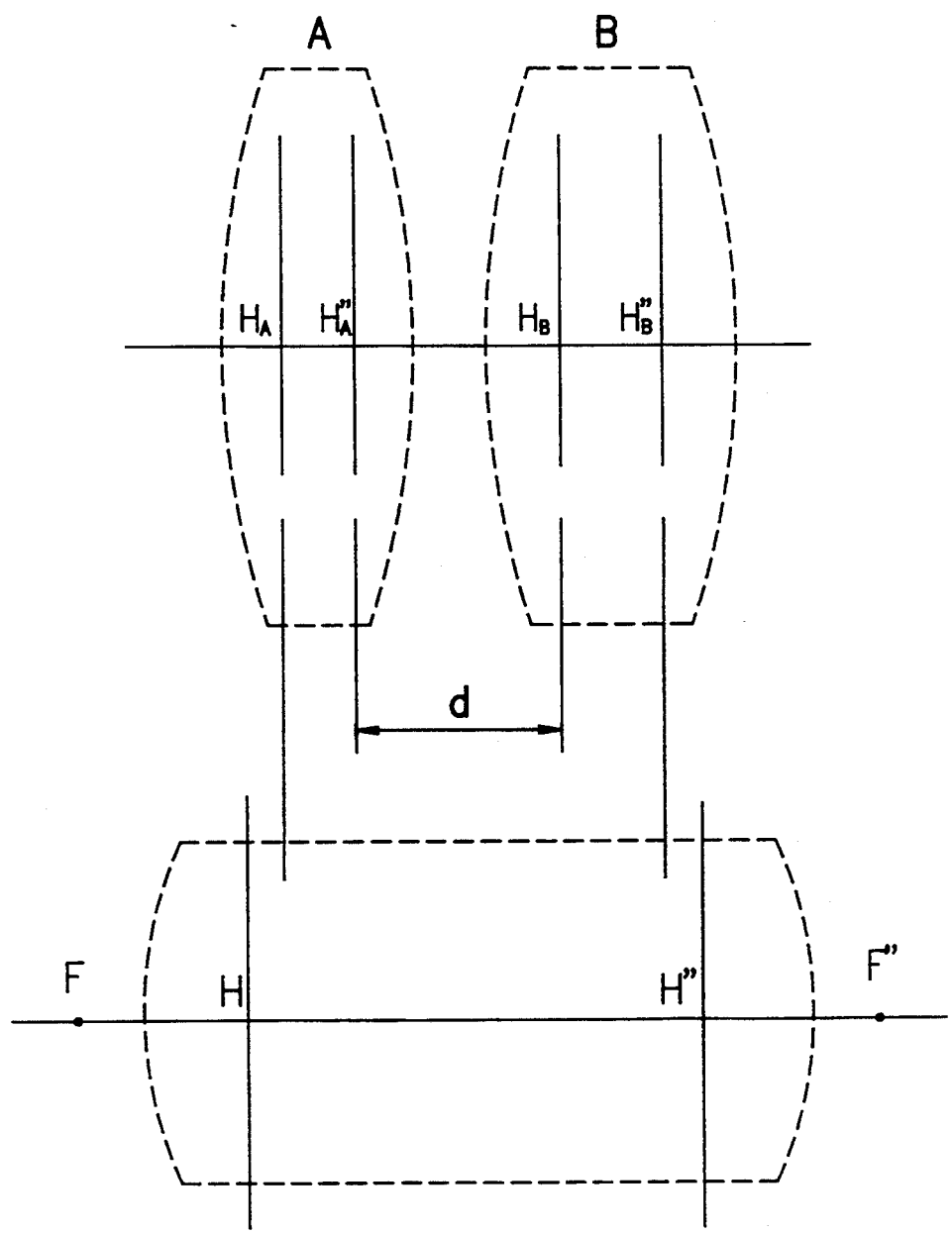
FIG. 15 is a schematic diagram illustrated to demonstrate the imaging principle of a group of two lens.

Referring to the two-lens system shown in FIG. 15, denote both the front focus point and the rear focus point of lens A by $f_A$ and those of the lens B by $f_B$. The distance between the second lens point $H_A''$ of lens A and the first lens point $H_B'$ of lens B is denoted by d. Regarding the two-lens system as a single optical unit, its first lens point H, front focus point F, the second lens point H", and the rear focus point F" can be derived with the following equations:

$$H'' \cdot H_B'' = \frac{-f_B \cdot d}{f_A + f_B - d} \qquad (5)$$

$$H \cdot H_A = \frac{-f_A \cdot d}{f_A + f_B - d} \qquad (6)$$

$$H'' \cdot F'' = \frac{f_A \cdot f_B}{f_A + f_B - d} = F \cdot H \qquad (7)$$

Similarly, the optical parameters of a multiple-lens system can be derived in the same way. In an m-lens system, denote the foremost lens that comes nearest to the object by $L_1$ and the subsequent ones by $L_2, L_3, \ldots L_m$. The optical parameters of the lens group ($L_1, L_2$) when regarded as a single optical unit can be derived using Eqs. (5)-(7). The resulted optical parameters can be used with the optical parameters of lens $L_3$ to determine the optical parameters of the lens group ($L_1, L_2, L_3$). Iteratively, we can derive the optical parameter of the lens group ($L_1, L_2, \ldots, L_m$).

The imaging of an object by a lens can be determined by the following equation:

$$1/S + 1/S'' = 1/H'' \cdot F'' \qquad (8)$$

where

S is the distance between the object and the front lens point H; and

S" is the distance between the imaging plane and the rear lens point H".

Based on the foregoing principles, assume that there are two lens groups C and D. The number and arrangement of lens in these two groups may not be the same; however, if their lens points $H_C$ and $H_D$, rear focus points $F_C''$ and $F_D''$, and rear lens points $H_C''$ and $H_D''$ are respectively in coincidence with each other, it can be obtained from Eq. (8) that the imaging plane of the lens group C is in coincidence with that of the lens group D. In other words, the magnification powers of the two lens groups C and D are the same.

Figure 16:
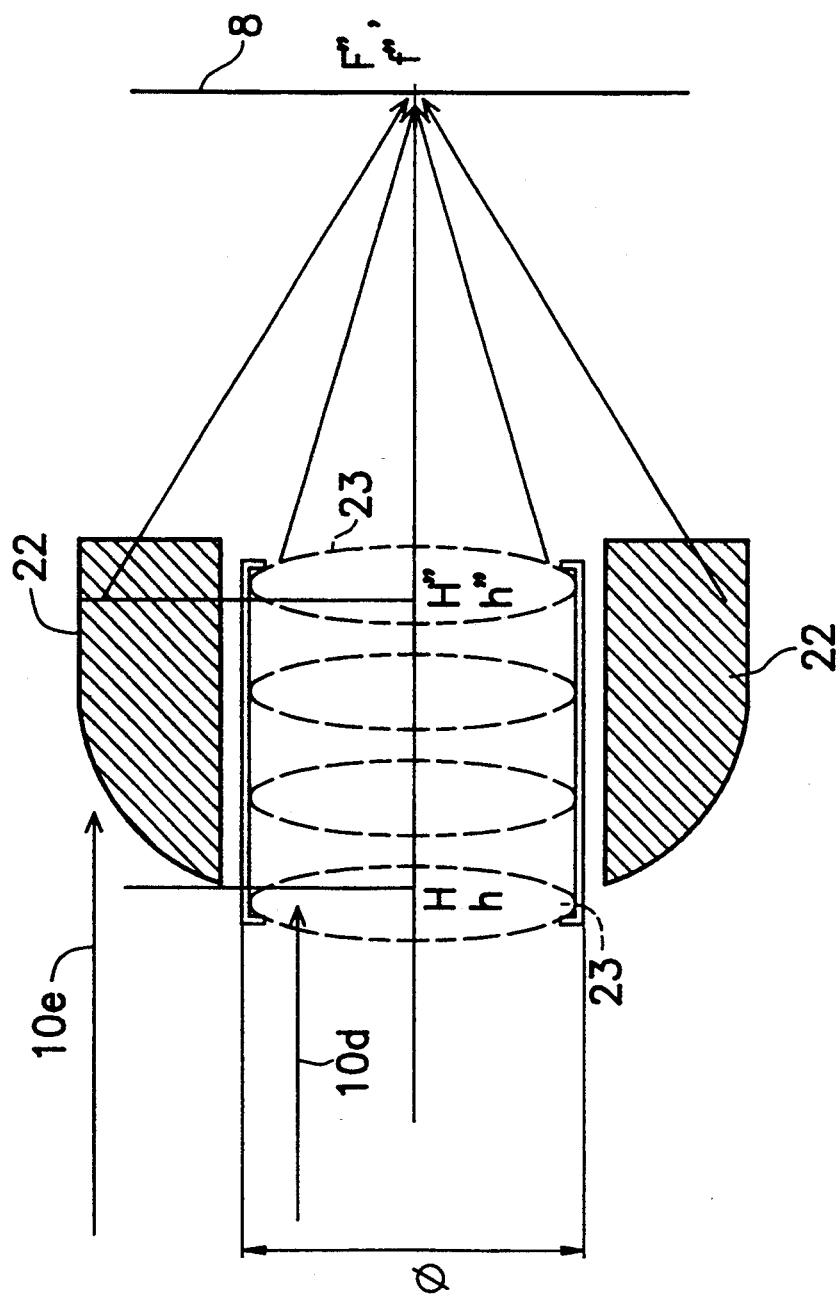
FIG. 16 is a schematic diagram, showing the structure of a fixed focus coaxial master-slave type lens.

FIG. 16 shows a fixed-focus coaxial master-slave type lens system. In general, the master lens group in a fixed-focus lens system is formed by mounting a group of m lenses into a lens frame having an outer diameter $\phi$. The lens frame is movable along the optical axis, whereas the lenses are immovable. Based on the foregoing equations, we can obtain the locations for the two lens points H and H" and the focus point F" of the fixed-focus lens system. A thick lens 22 having an outer diameter larger than that of the lens frame is used to form the slave lens. The two lens points of this thick lens are h and h" and the focus point is f". In the design, we allow h h" = HH" and h"f" = H"F". The center part of the thick lens is hollowed to form an circular opening. The diameter of this circular opening is larger than $\phi$. The slave lens 22 is sleeved onto the lens frame in such a way that the lens point h and h" of the slave lens are respectively in coincidence with the lens points H and H" of the master lens group, and that the focus point f" of the slave lens is in coincidence with the focus point of the master lens group. The coaxial master-slave lens system is thus completed. A light ray 10d, which passes through the master lens group, and another light ray 10e, which passes through the slave lens 22, will form their respective images on the same imaging plane 8.

Figure 17:
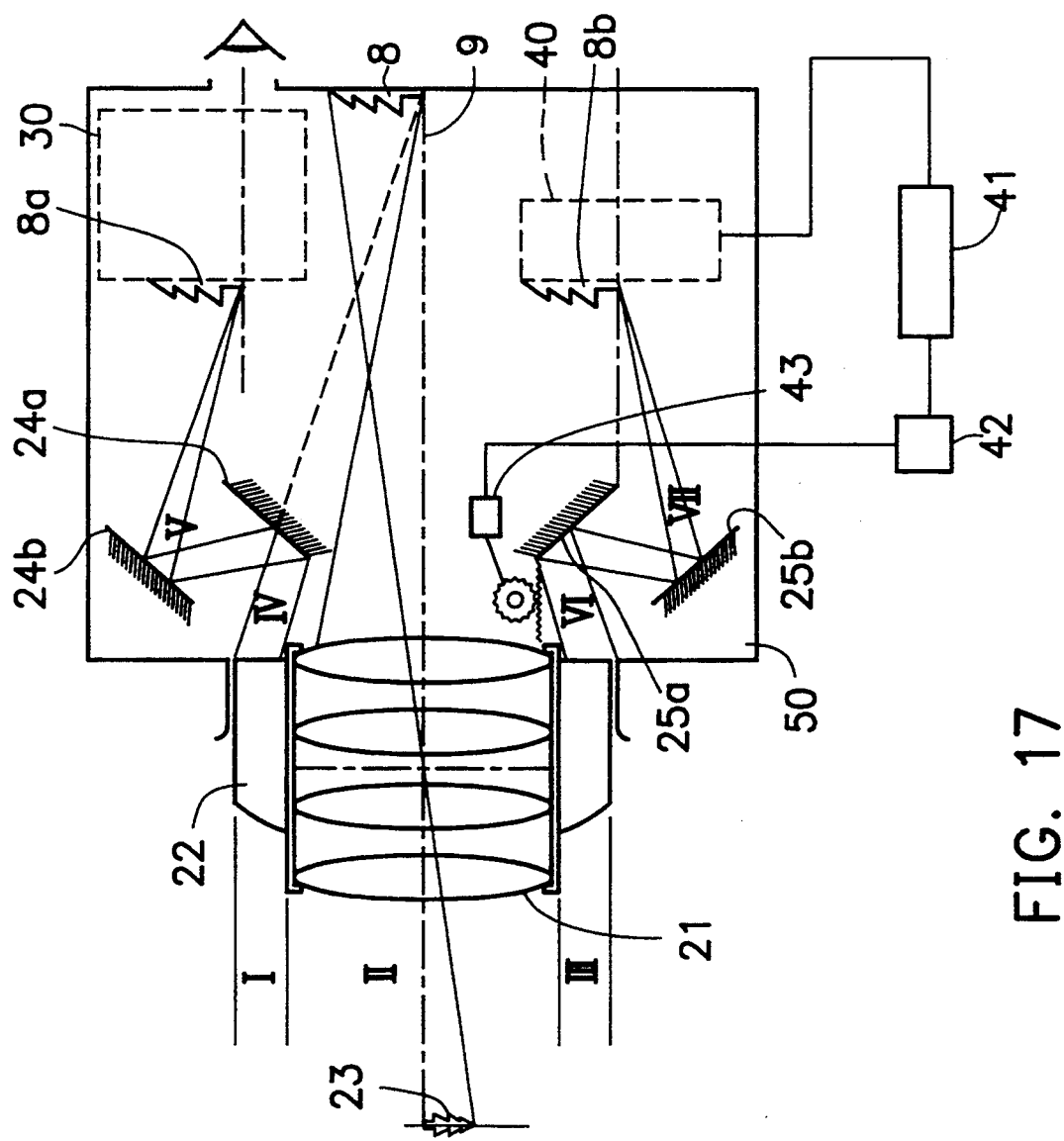
FIG. 17 is a schematic diagram, showing the system configuration of a camera utilizing the coaxial master-slave lens system according to the first preferred embodiment of the present invention.

FIG. 17 shows the first preferred embodiment of a camera 50 utilizing the foregoing coaxial master-slave lens system. The camera 50 includes a master lens group 21, a slave lens 22, a first mirror group (24a, 24b), a second mirror group (25a, 25b), a viewfinder optical system 30, a focusing optical system 40, a focusing controller 41, a motor-driven actuator 42, and a motor 43.

Referring to FIG. 17, light rays received by the master-slave lens system can be divided into three groups I, II, and III. Light rays of group I will pass through the master lens system 21 and then form a real image $IMG_1$ on the imaging plane 8. A photo-sensor can be placed at the imaging plane to photograph the image. Light rays of group II will pass through the slave lens 22; after passing through the slave lens 22, this group of light rays will be referred as group IV. According to the principle of the slave lens described above, the group IV light rays will form a real image on the imaging plane 8. It is an important aspect of the present invention that a first plane mirror group (24a, 24b) is provided to the back of the slave lens 22 so that part of the rays (denoted by group V) in the group IV are diverted by the first plane mirror group (24a, 24b). The group V light rays will form a real image on the imaging plane $IMG_2$. The size and shape of the real image $IMG_2$ is the same as that of the real image $IMG_1$. The light rays forming the real image $IMG_2$ subsequently enter into the viewfinder which is provided with optics capable of magnifying and erecting the image $IMG_2$ for viewing by human eyes. Using the viewfinder 30, the user of the camera can see an upright, non-reversed image of the object. The center of the viewed image is in exact coincidence with the optical axis of the photographing optical system.

The group III light rays pass through the lower portion of the slave lens 22. After passing through, they are referred to as group IV light rays. The plane mirror group (25a, 25b) is placed in symmetry with the plane mirror group (24a, 24b). The group IV light rays, without the provision of the plane mirror group (25a, 25b), will form a real image on the imaging plane 8. Part of the group IV light rays are reflected twice by the plane mirror group (25a, 25b). The reflected part will form a light ray group VII, which then forms a real image $IMG_3$ on the imaging plane 8b. The size and shape of the real image $IMG_3$ is the same as that of the real image $IMG_1$. After passing the imaging plane 8b, the light rays forming the image $IMG_3$ are detected by the focus adjustment system. This focus adjustment system may employ that utilized in conventional SLR type cameras or employ the FFT frequency analysis hardware and software utilized in conventional camcorder.

The focus adjustment system generates focusing error signal in responsive to the detected light rays that form the image $IMG_3$. The focusing error signal is then used by servo unit (including the controller 41, the motor-driven actuator 42, and the motor 43) to move the master-slave lens system along the optical axis 9 until the real image IMG₃ is in focus. Since the focus point of the master lens system is in coincidence with that of the slave lens, at the time the real image IMG₃ is in focus on the imaging plane 8b the real image IMG₁ is also in focus on the imaging plane 8. Therefore, releasing the shutter when image is in focus will cause the camera to take a clear picture of the object.

Figure 19:
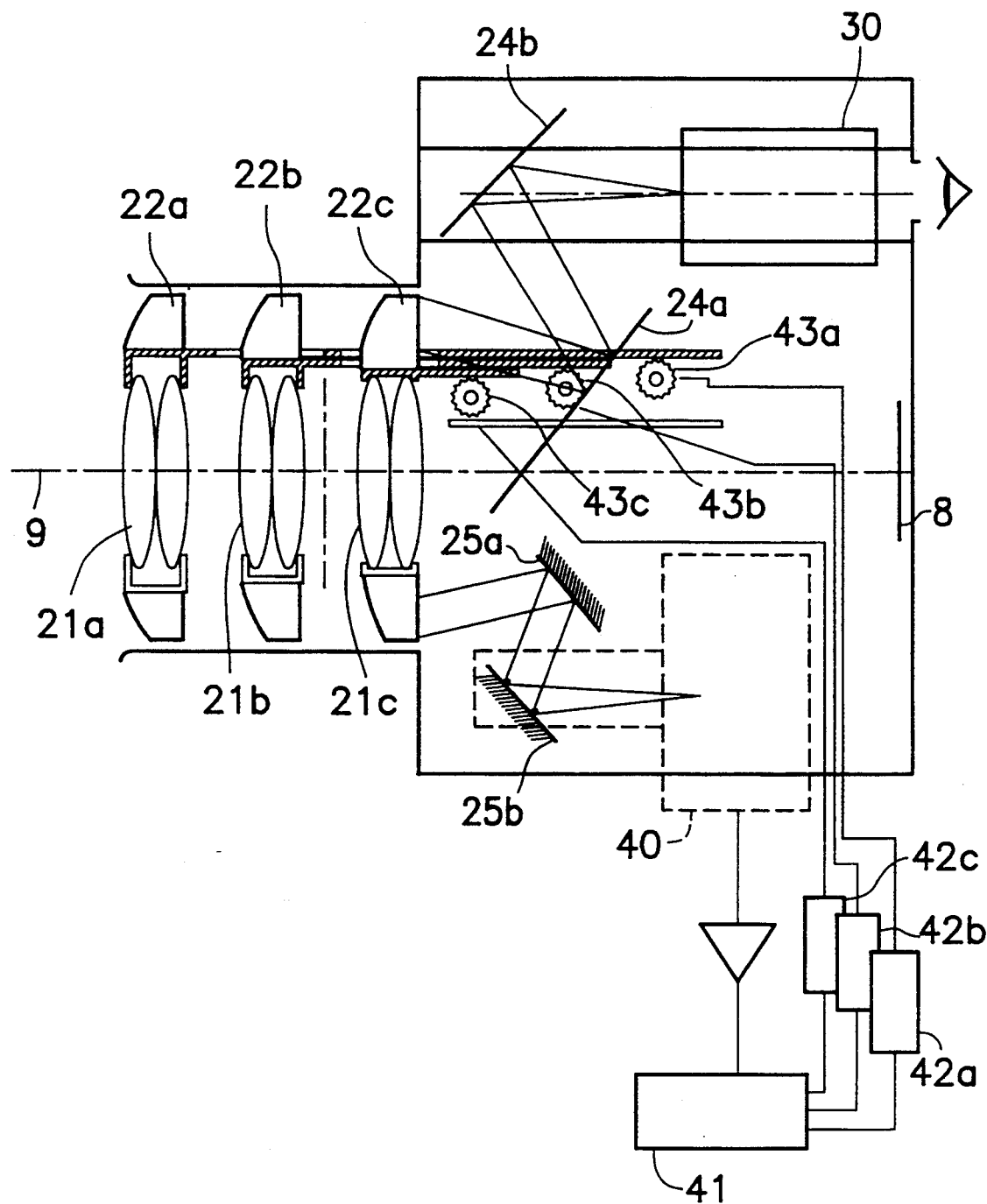
FIG. 19 is a schematic diagram, showing the system configuration of a camera utilizing the coaxial master-slave lens group according to the second preferred embodiment of the present invention.

FIG. 19 shows another embodiment of a camera utilizing the coaxial master-slave lens system according to the present invention. The second embodiment differs from the first one shown in FIG. 17 in that a "coaxial master-slave zoom lens system" is mounted to the camera.

Figure 18:
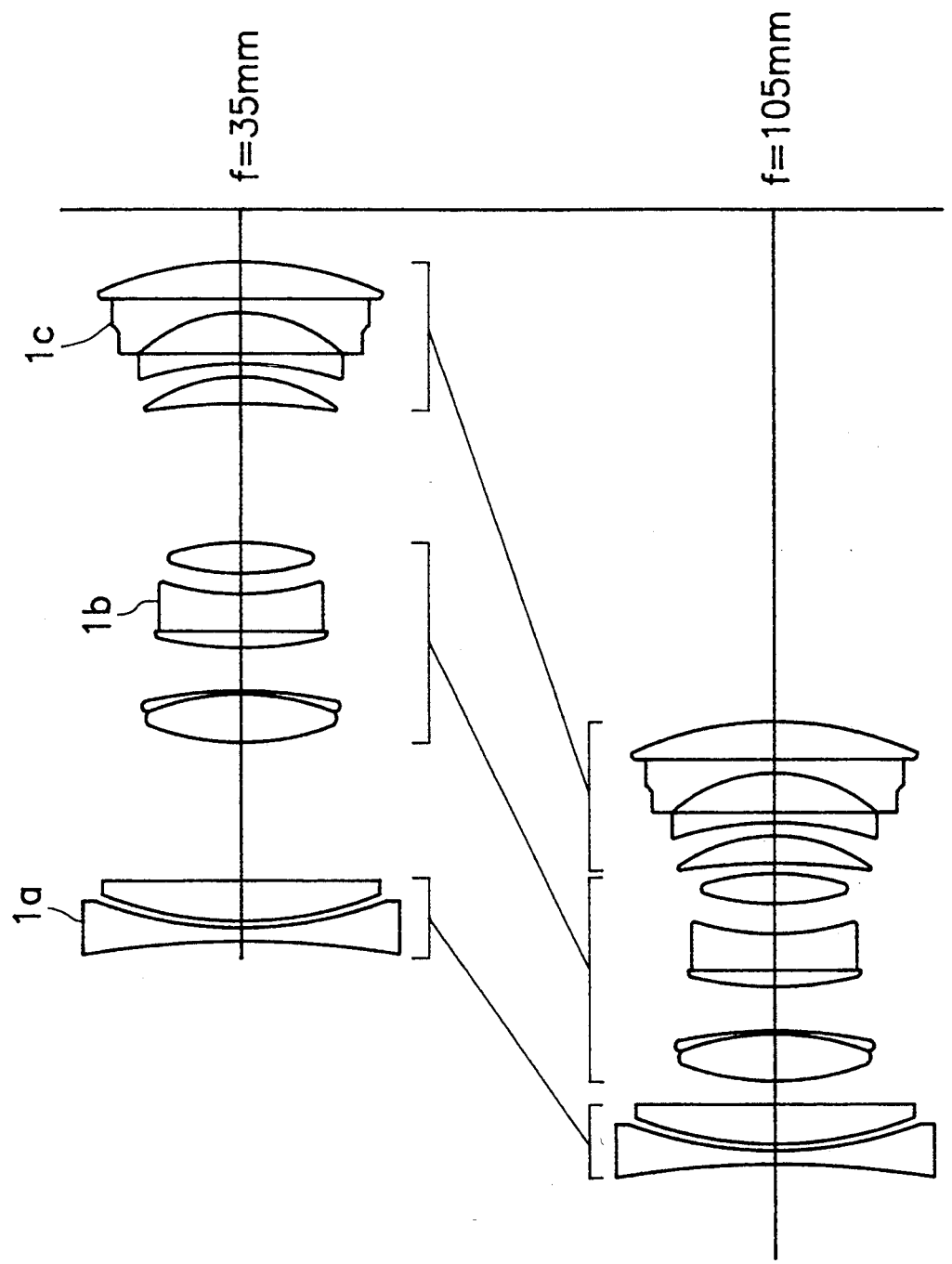
FIG. 18 is a schematic diagram of a conventional zoom lens.

Before introducing the coaxial master-slave zoom lens system, the structure of conventional zoom lenses will be briefly described. Referring to FIG. 18, this zoom lens include m lenses, which are divided into k groups (k=3 in this example). Each lens group is fitted to a movable lens frame. Each lens fitted in the movable lens frame, however, is fixed and thus immovable. To adjust focus length, the distance between neighboring lens frame can be adjusted by moving them along the optical axis. To perform focusing, all the lens frames are moved along the optical axis while keeping their relative positions unchanged. The focus length will keep unchanged.

Referring back to FIG. 19, for each of the three lens groups (21a, 21b, 21c) in the zoom lens system of the camera, a slave lens is provided thereto. In total, three slave lenses (22a, 22b, 22c) are used. Each slave lens, as before, has its lens planes and focus point in coincidence with those of its associated lens group.

Figure 1:
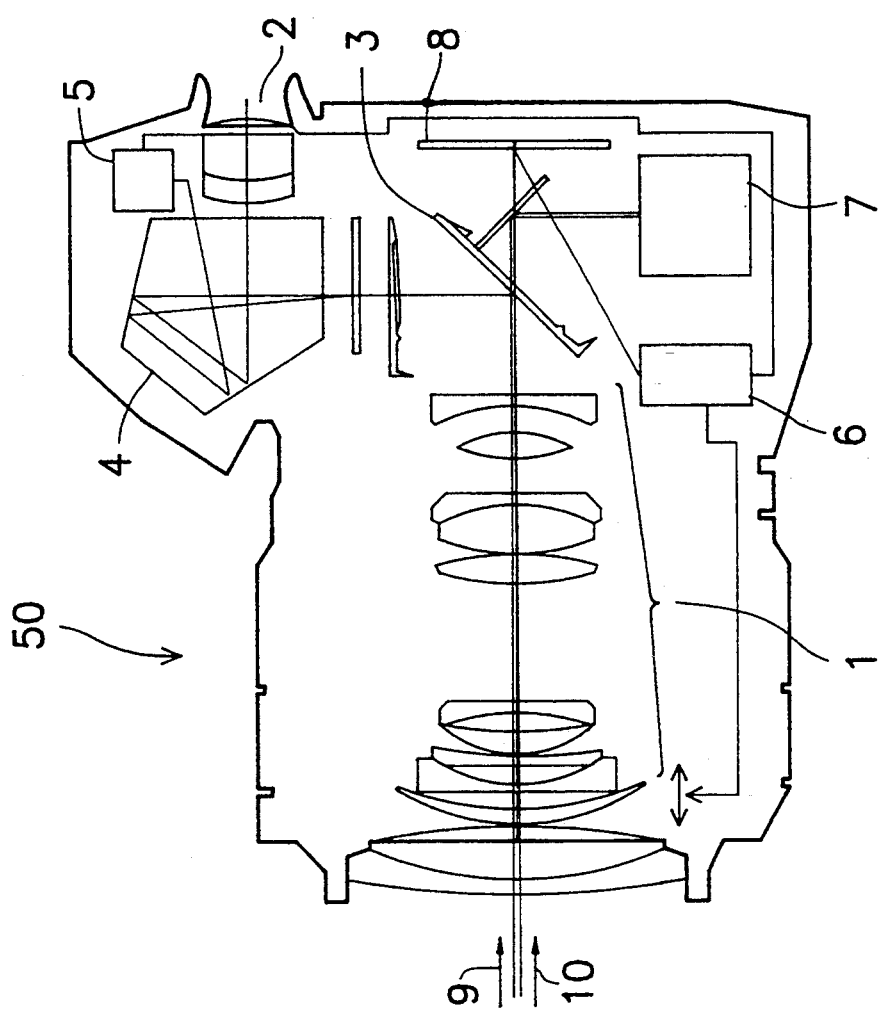
FIG. 1 is a sectional view, showing the structure of a conventional single lens reflection (SLR) type camera.
Figure 2B:
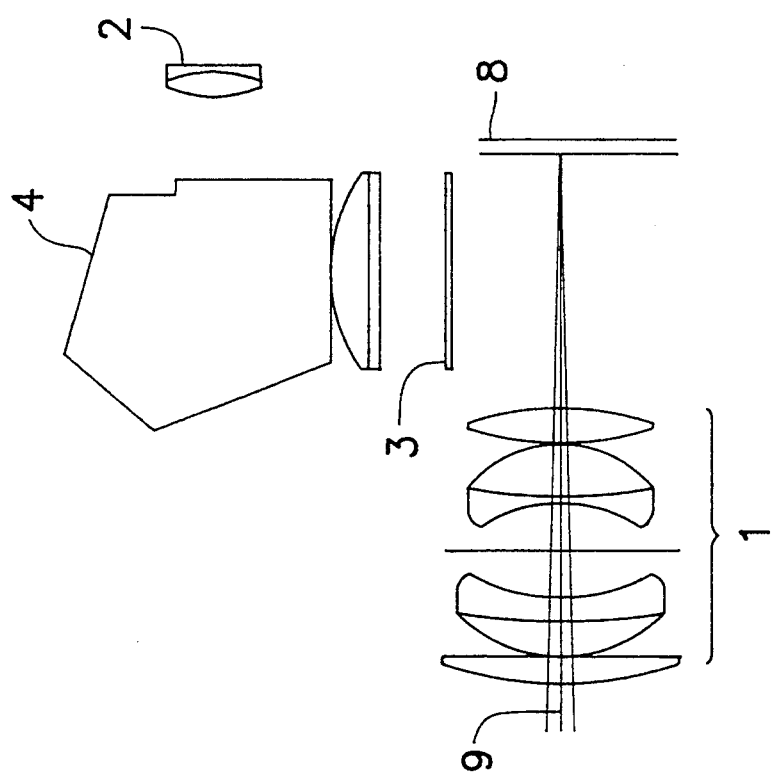
FIG. 2B shows the camera of FIG. 1 in photographing mode.
Figure 2A:
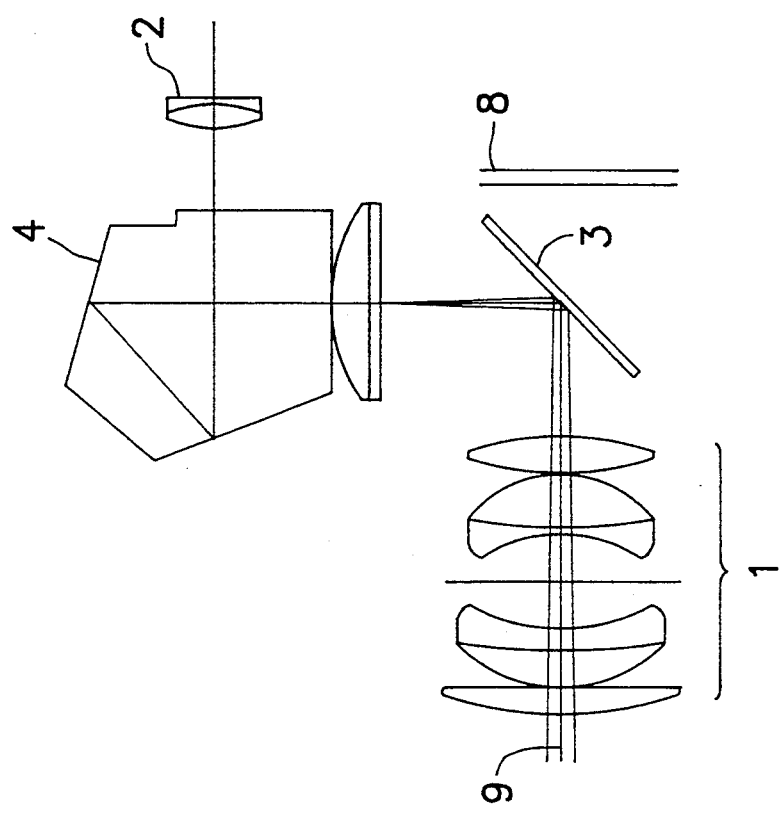
FIG. 2A shows the camera of FIG. 1 in viewfinding mode.
Figure 3B:
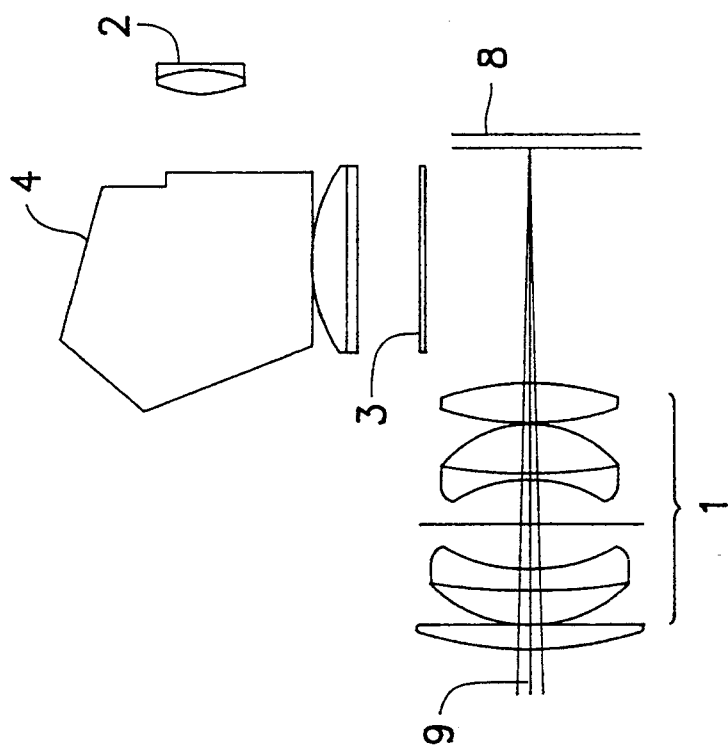
FIG. 3B shows the camera of FIG. 1 when its reflection mirror is raised.
Figure 3A:
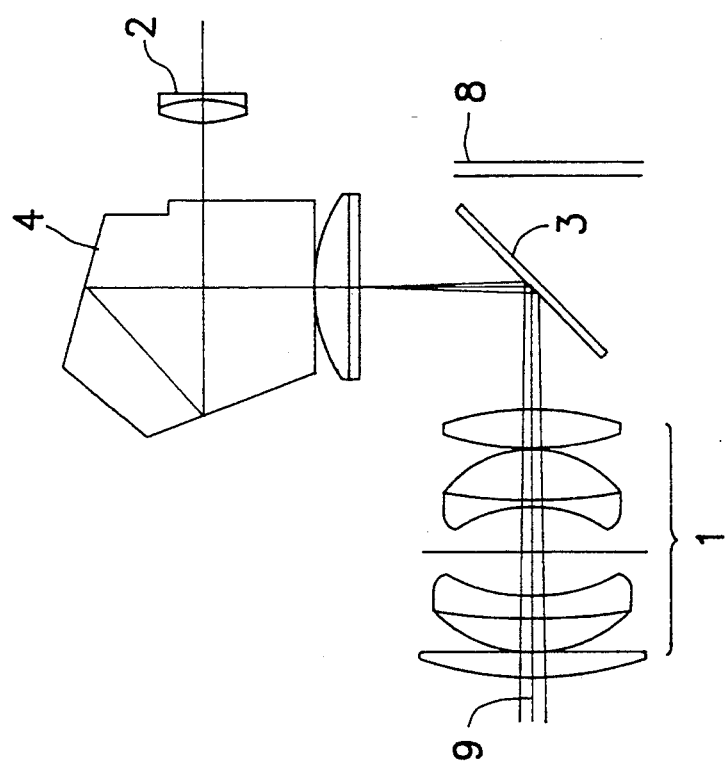
FIG. 3A shows the camera of FIG. 1 in viewfinding mode.
Figure 3C:
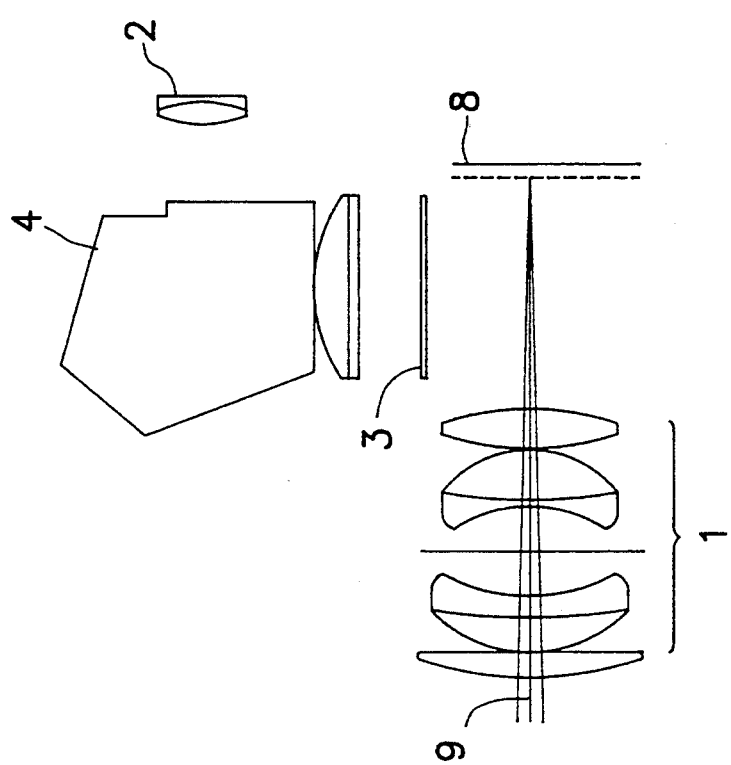
FIG. 3C shows the camera of FIG. 1 when its shutter is open.
Figure 4:
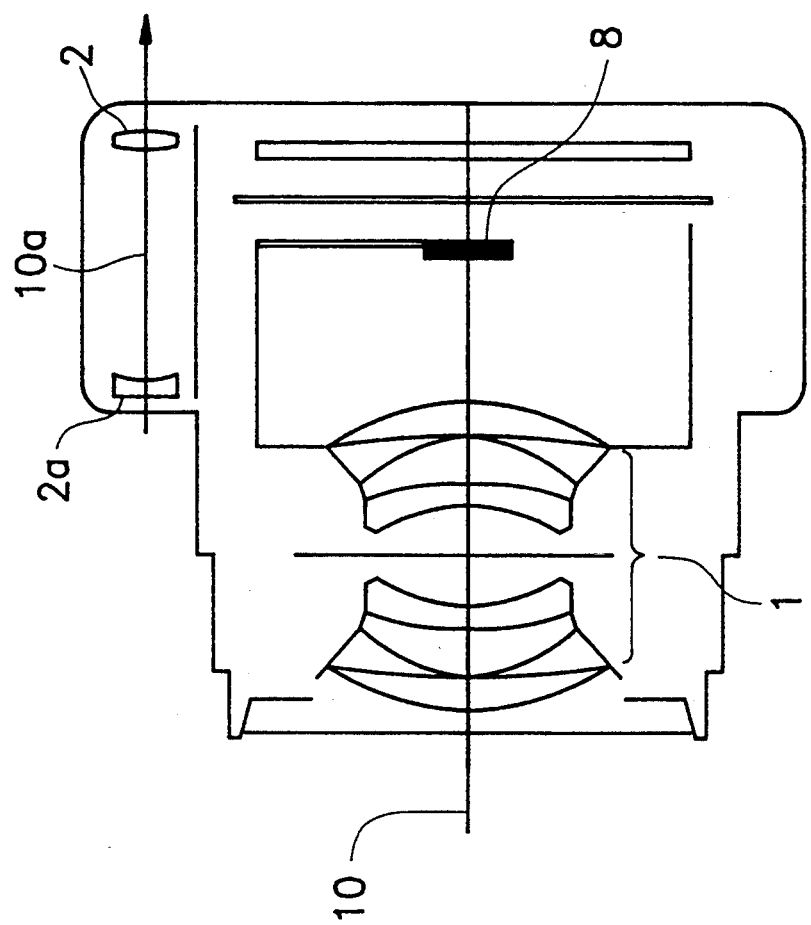
FIG. 4 is a sectional view, showing the structure of a conventional shutter-in-lens type camera.
Figure 5A:
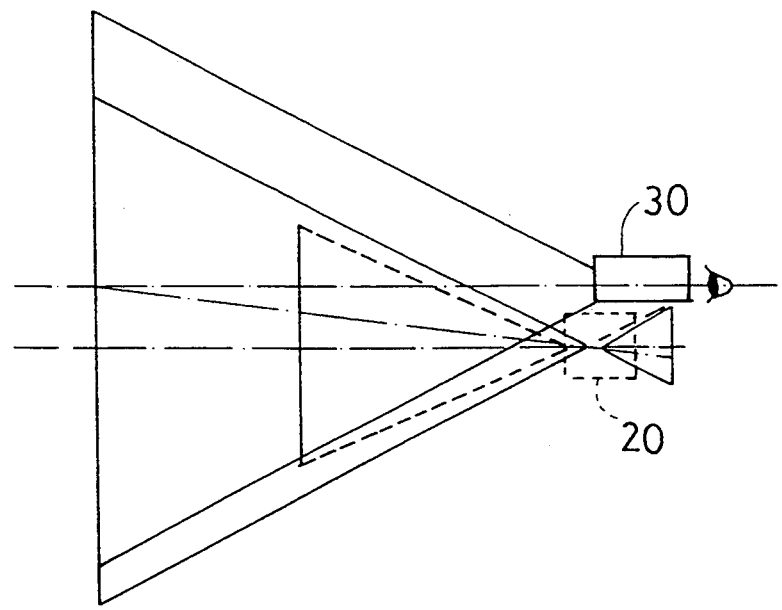
FIG. 5A is an illustration particularly used to show the optical axis of the viewfinder optics and that of the photographing optics.
Figure 5B:
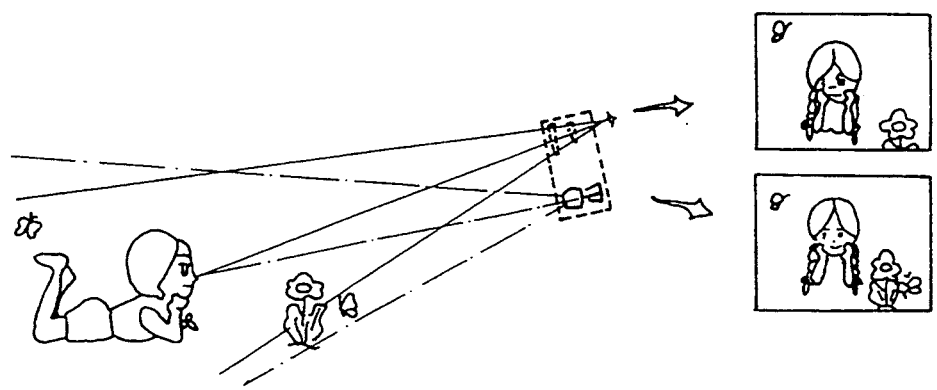
Figure 6:
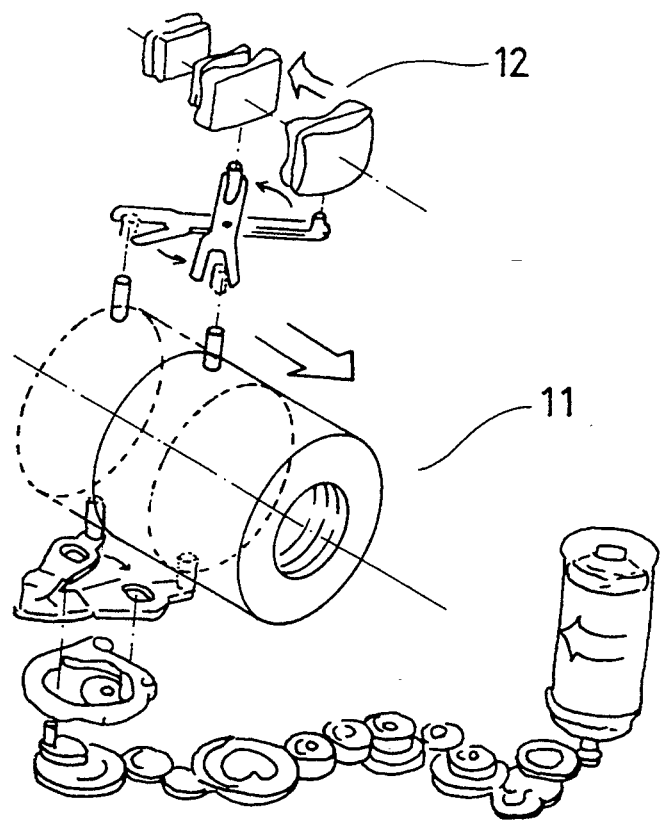
FIG. 6 shows the configuration of how the zoom lens in the conventional shutter-in-lens type camera is associated with the viewfinder system.
Figure 7:
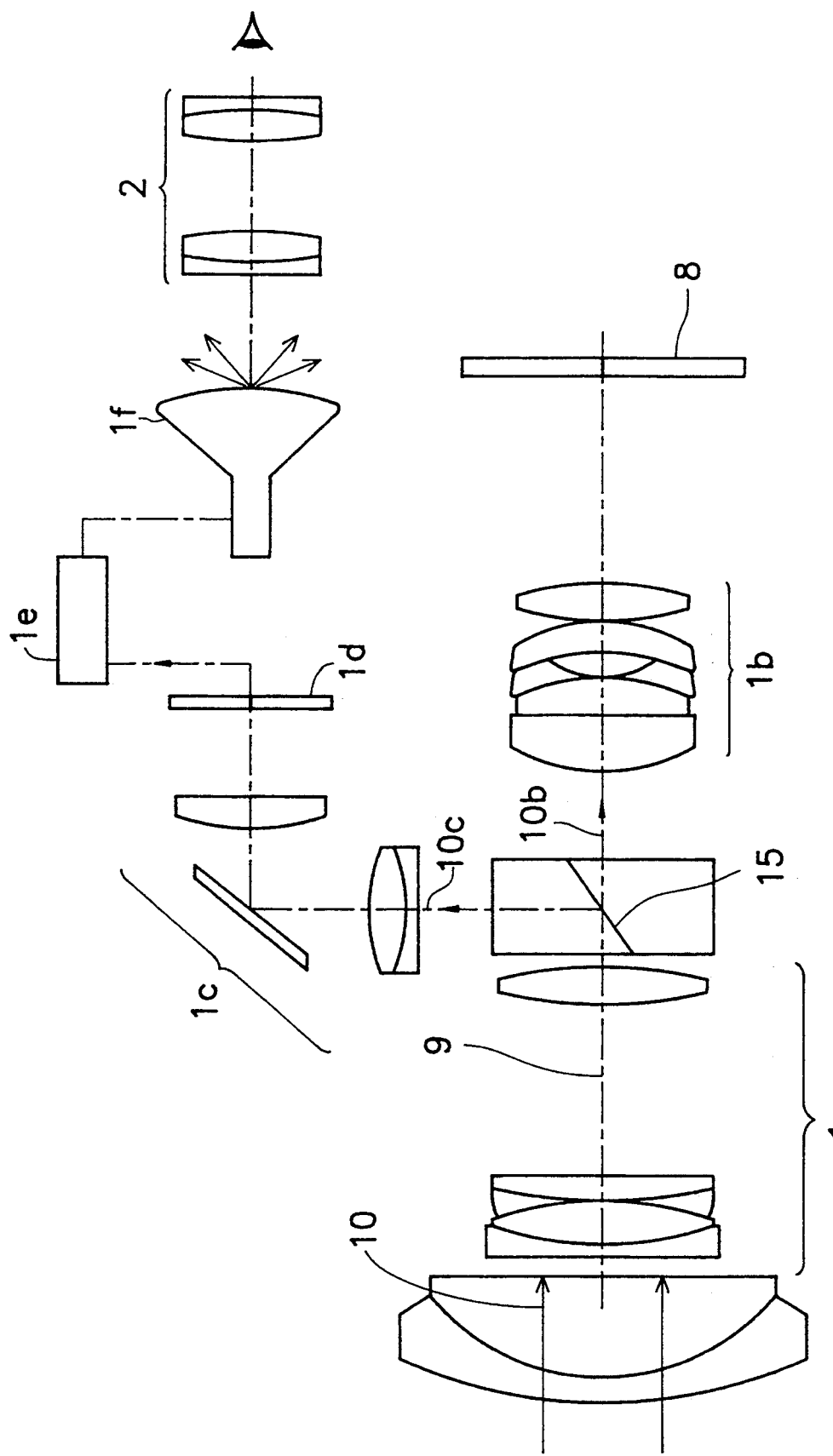
FIG. 7 is a sectional view, showing the structure of the viewfinder optics in a conventional camcorder.
Figure 8A:
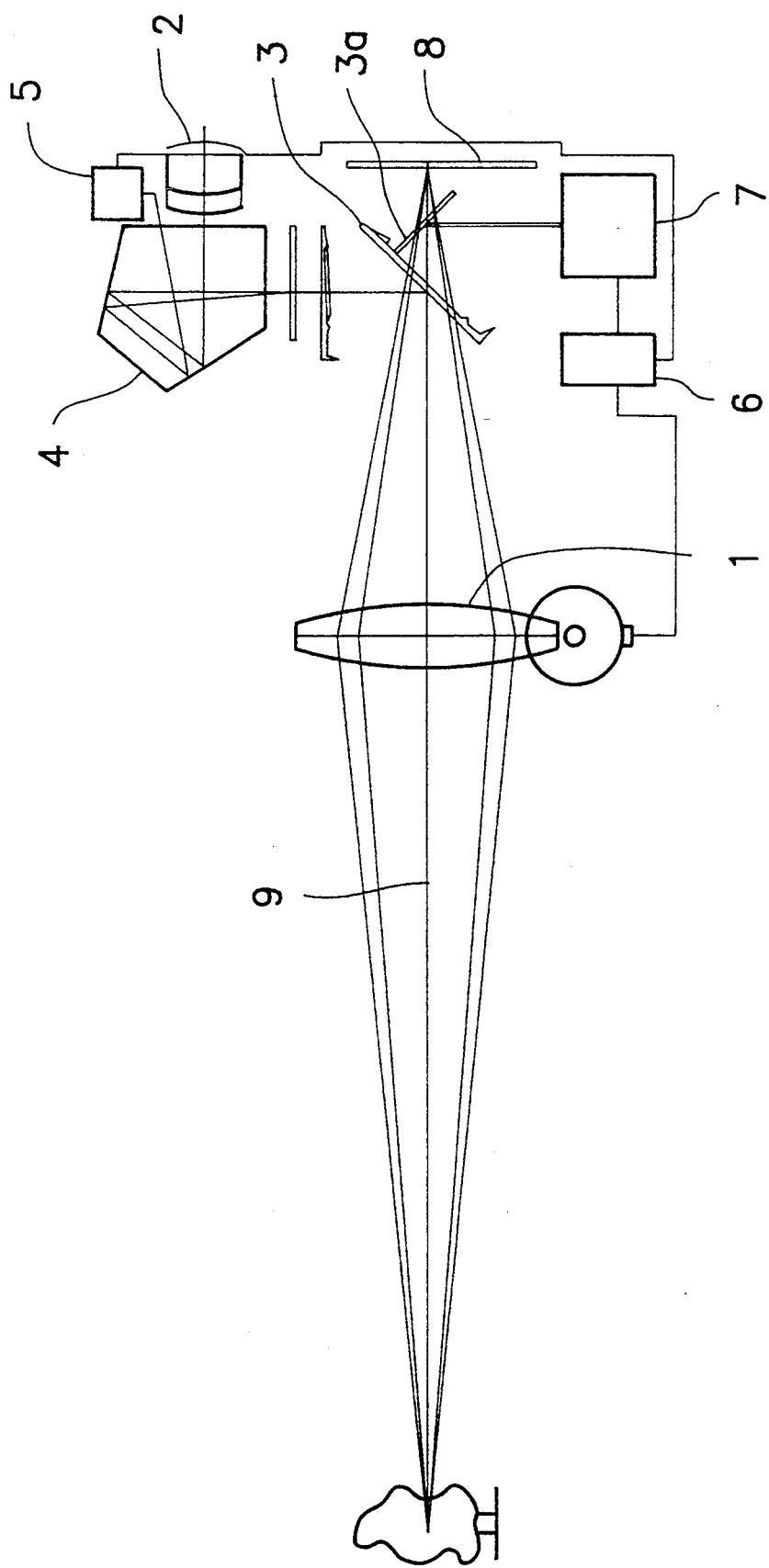
FIG. 8A is an illustration used to depict the working principle of the conventional SLR type camera.
Figure 8B:
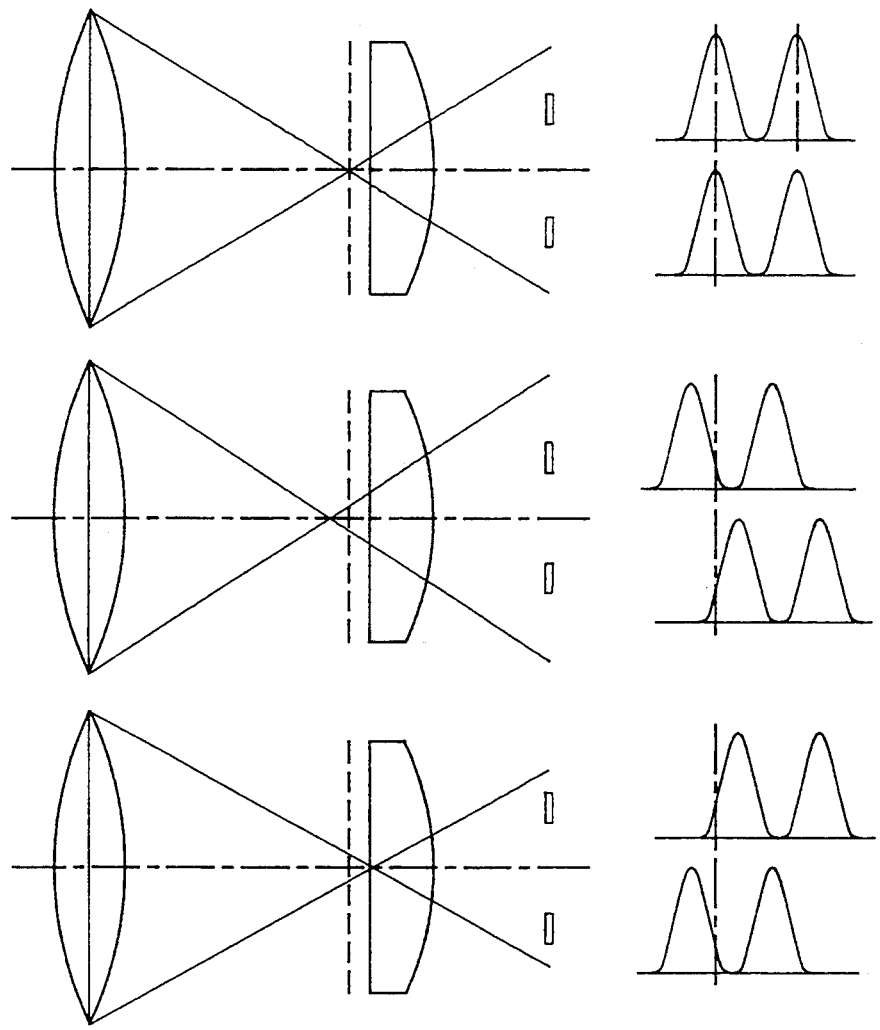
FIG. 8B shows how focusing error signal is varied in responsive to error in focusing, which is used by the system of FIG. SA for automatic focus adjustment.
Figure 9A:
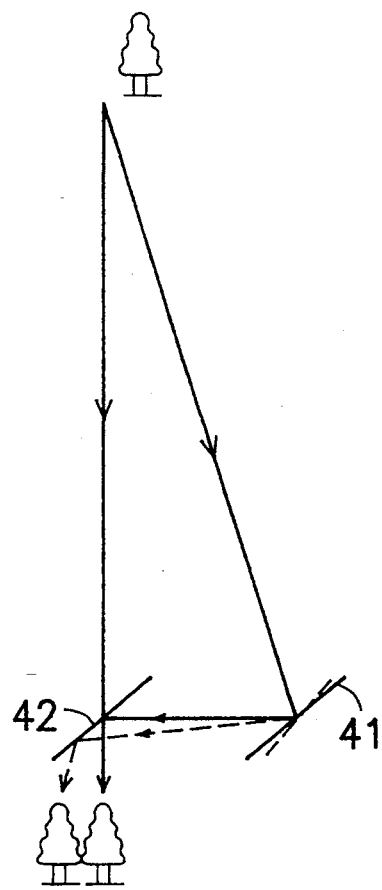
FIG. 9A is an illustration used to depict the working principle of an optics setup for focusing.
Figure 9B:
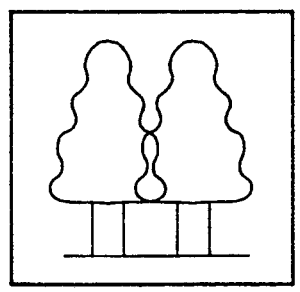
FIG. 9B shows the image pattern formed by the optics shown in FIG. 9A.
Figure 10:
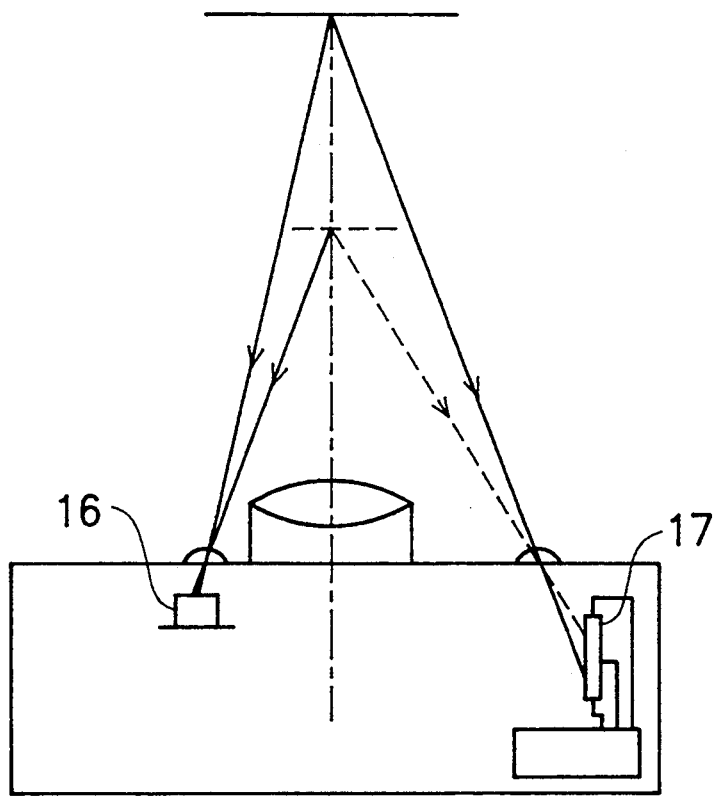
FIG. 10 is an illustration used to depict the working principle of another optics setup for focusing.
Figure 11:
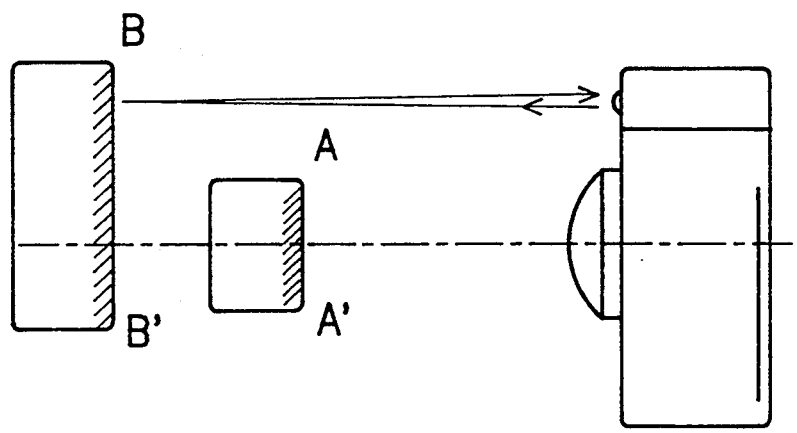
FIG. 11 is an illustration used exemplarily to depict that the conventional shutter-in-lens type camera may be focused at a farther object.
Figure 13A:
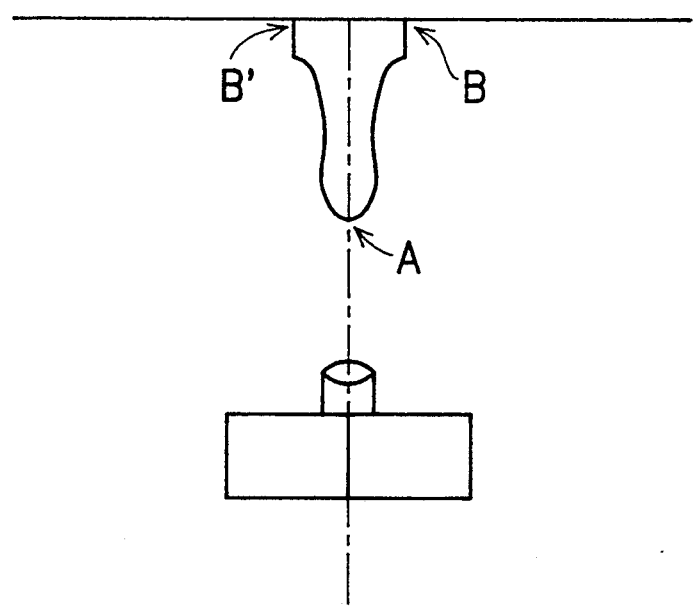
FIG. 13 shows a faulty focusing operation by the conventional camcorder.
Figure 13B:
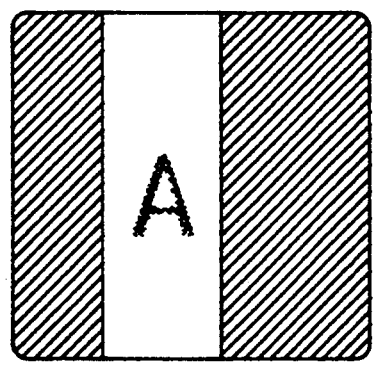
Figure 20:
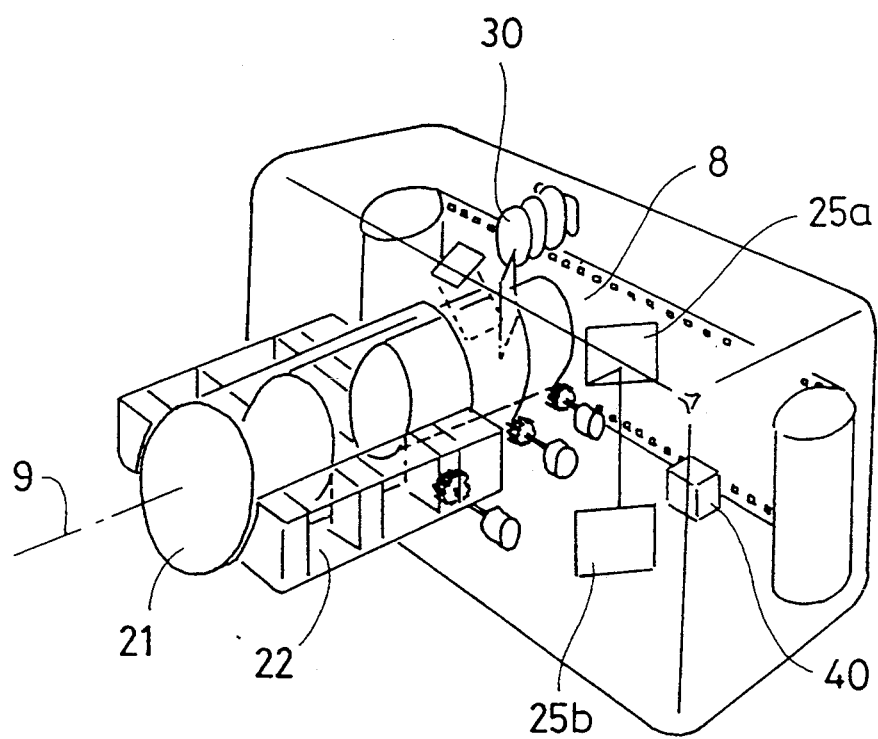
FIG. 20 is a perspective view of the camera shown in FIG. 19.

Referring also to the perspective view of FIG. 20, the setup of optics inside the camera for processing light rays passing through the coaxial master-slave zoom lens system is much the same as that provided in the camera of FIG. 17. The working principle is also the same. The only difference is that three motors are used to respectively move the three master-slave lens groups. By this camera, each slave lens moves together with its master lens, so that zooming and focusing can be simultaneously observed through the viewfinder. Compared with the conventional camera of FIG. 6 which uses an additional zooming/focusing mechanism for servo control of the viewfinder optical system, the camera of FIG. 19 is significantly reduced in number and complexity of its constituent optical components.

As described above, the camera equipped with the coaxial master-slave lens system combines the advantages of camera and camcorder and overcomes their drawbacks. The following tables summarize and compare the advantages and disadvantages of viewfinder and focusing optical systems respectively in the photographing equipment provided with the coaxial master-slave lens system according to the present invention and the conventional camera and camcorder.

TABLE 3

| | Viewfinder Optical Systems | | | |
|---|---|---|---|---|
| | SLR camera | Shutter-in-lens camera | camcorder | Present invention |
| | optical axis not in coincidence with that of photographing optical system; using a jumping plane mirror. | Independent of photographing system | optical axis not in coincidence with that of photographing optical system; using a fixed light splitter. | Using a master-slave type lens; coaxial with the photographing system while independent of each other. |
| Performance | Good | Good Poor | Good Poor | Good Poor |
| Viewfinder optical axis in coincidence with that of photographing optical system? | Yes | No | Yes | Yes |
| Light flux not split by viewfinder system and thus reduced in intensity? | Yes | Yes | No | Yes |
| Photographing and viewfinding able to function concurrently? | No | Yes | Yes | Yes |
| Shutter opened right after the shutter release button is pressed? | No | Yes | Yes | Yes |
| Viewfinder system more | No | Yes | Yes | Yes |

TABLE 3-continued

| Viewfinder Optical Systems | | | | |
|---|---|---|---|---|
| | SLR camera | Shutter-in-lens camera | camcorder | Present invention |
| light and compact when fixed-focus lens is mounted? | | | | |
| Viewfinder system more light and compact when zoom lens is mounted? | No | No | Yes | YEs |
| Viewfinder and imaging require power consumption? | Yes | Yes | No | Yes |
| Resolution of the image in viewfinder high? | Yes | Yes | No | Yes |
| Image in viewfinder close to true color? | Yes | Yes | No | Yes |

TABLE 4

| Focusing optical System | | | | | |
|---|---|---|---|---|---|
| | SLR camera | Shutter-in-lens camera | | camcorder | Present Invention |
| Illumination of object | Same as photographing system | Same as photographing system | Reflect a light beam from the camera | Same as photographing system | Same as photographing system |
| Method of collecting object light | Use part of photograph-system and then split the light with the jumping mirror | Independent of photographing system; use two separate apertures for imaging | Independent of photographing system; use one single aperture for imaging | Completely dependent on the photographing system | Using master-slave lens; coaxial with the photographing system while independent of each other |
| Processing of object light | Split the object image and the compare the two. | Overlap the split images for comparison | Use photo-imparting sensors | Perform FFT analysis to the object image | Using either image comparison or FFT method |
| Photo-sensor | two | one linear array | position sensing detector | Plane 2-D array | Dependent on result of the above application. |
| Performance | Good  Poor | Good  Poor | Good  Poor | Good  Poor | Good  Poor |
| Optical axis in coincidence with that of the photographing system? | Yes | No | No | Yes | Yes |
| Not mistake other objects for the one being under focusing? | Yes | Yes | No | No | Yes |
| Light source need not to be self-prepared? | Yes | Yes | No | Yes | Yes |

TABLE 4-continued

| | Focusing optical System | | | |
|---|---|---|---|---|
| | SLR camera | Shutter-in-lens camera | camcorder | Present Invention |
| Processing of electric signal generated by the focusing system not complex? | Yes | Yes | Yes | No | Yes |
| Focusing and viewfinding able to monitor each other? | Yes | No | No | Yes | Yes |
| Mechanical construction of the focusing system not complex, i.e. does not have to actuate a plane mirror? | No | No | Yes | Yes | Yes |

The present invention has been described hitherto with exemplary preferred embodiments. However, it is to be understood that the scope of the present invention need not be limited to the disclosed preferred embodiment. On the contrary, it is intended to cover various modifications and similar arrangements within the scope defined in the following appended claims. The scope of the claims should be accorded the broadest interpretation so as to encompass all such modifications and similar arrangements.

What is claimed is:

1. A coaxial master-slave lens camera system, comprising:
   (a) at least a master lens having:
      (1) a master optical axis,
      (2) a master front lens plane,
      (3) a master rear lens plane,
      (4) a master front focus point, and
      (5) a master rear focus point;
   (b) at least a slave lens having:
      (1) a slave optical axis,
      (2) a slave front lens plane,
      (3) a slave rear lens plane,
      (4) a slave front focus point, and
      (5) a slave rear focus point;
   said slave lens having a center hollowed portion for accommodating said master lens in such a manner that:
      (1) the slave optical axis is in coincidence with the master optical axis:
      (2) the slave front lens plane is in coincidence with the master front lens plane,
      (3) the slave rear lens plane is in coincidence with the master rear lens plane,
      (4) the slave front focus point is in coincidence with the master front focus point, and
      (5) the slave rear focus point is in coincidence with the master rear focus point;
   (c) an photographing optical system for receiving light rays passing through said master lens;
   (d) a viewfinder optical system for receiving light rays passing through said slave lens; and
   (e) a focus adjustment optical system for receiving light rays passing through said slave lens to generate focus adjustment servo signal.

2. A coaxial master-slave lens camera system as claimed in claim 1, wherein said viewfinder optical system comprises a plane mirror group for reflecting part of the light rays passing through said slave lens.

3. A coaxial master-slave lens camera system as claimed in claim 1, wherein said focusing optical system comprises a plane mirror group for reflecting part of the light rays passing through said slave lens.

4. A coaxial master-slave zoom lens camera system, comprising:
   (a) a zoom lens consisting of a number of master lens groups, each lens group having:
      (1) a master optical axis,
      (2) a master front lens plane,
      (3) a master rear lens plane,
      (4) a master front focus point, and
      (5) a master rear focus point;
   (b) a plurality of slave lenses equal in number to said master lens groups, each slave lens having
      (1) a slave optical axis,
      (2) a slave front lens plane,
      (3) a slave rear lens plane,
      (4) a slave front focus point, and
      (5) a slave rear focus point;
   said each slave lens having a center hollowed portion for accommodating each said master lens in such a manner that:
      (1) the slave optical axis is in coincidence with the master optical axis:
      (2) the slave front lens plane is in coincidence with the master front lens plane,
      (3) the slave rear lens plane is in coincidence with the master rear lens plane,
      (4) the slave front focus point is in coincidence with the master front focus point, and (5) the slave rear focus point is in coincidence with the master rear focus point;

(c) an photographing optical system for receiving light rays passing through said master lens;

(d) a viewfinder optical system for receiving light rays passing through said slave lens; and (e) a focus adjustment optical system for receiving light rays passing through said slave lens to generate focus adjustment servo signal.

5. A coaxial master-slave lens camera system as claimed in claim 4, wherein said viewfinder optical system comprises a plane mirror group for reflecting part of the light rays passing through said slave lens.

6. A coaxial master-slave lens camera system as claimed in claim 4, wherein said focusing optical system comprises a plane mirror group for reflecting part of the light rays passing through said slave lens.

* * * * *